March 29, 1960 C. B. THOMAS 2,930,112
ADJUSTABLE CUTTER FOR SPIRAL BEVEL GEARS AND THE LIKE
Filed July 1, 1957
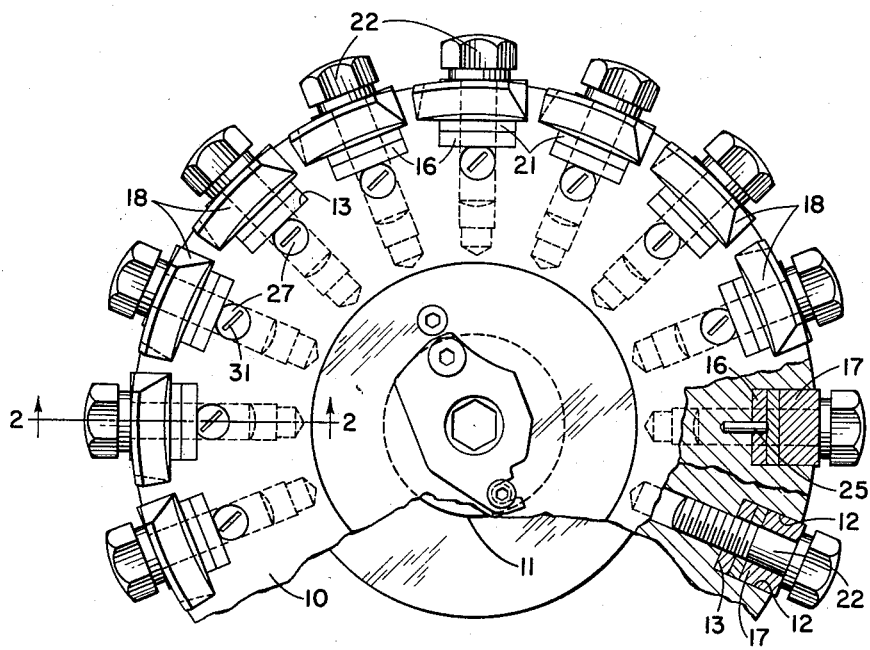
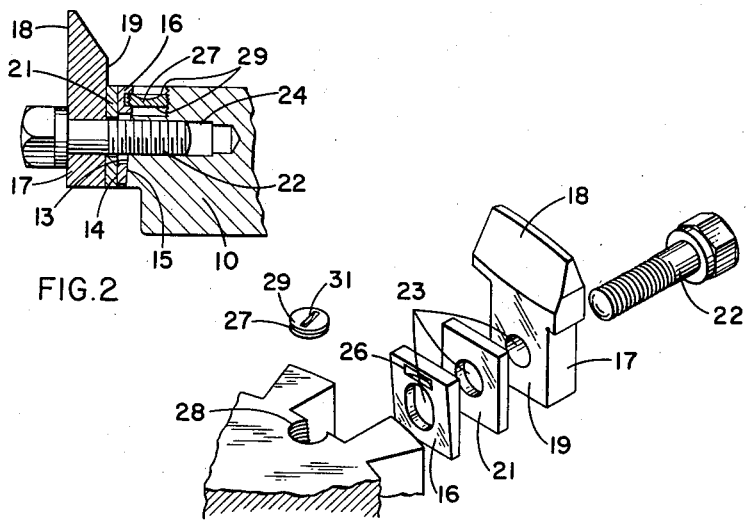
INVENTOR.
CHARLES B. THOMAS
BY
Richard W. Treverton
ATTORNEY

United States Patent Office 2,930,112
Patented Mar. 29, 1960

2,930,112

ADJUSTABLE CUTTER FOR SPIRAL BEVEL GEARS AND THE LIKE

Charles B. Thomas, Rochester, N.Y., assignor to The Gleason Works, Rochester, N.Y., a corporation of New York Application July 1, 1957, Serial No. 669,363

4 Claims. (Cl. 29—105)

The present invention relates to face mill cutters, for spiral bevel gears and the like, in which the blades are held in slots in the periphery of a circular cutter head by means of tension screws, and in which wedges are provided for adjusting the blades radially.

Such tension screws extend through centrally located openings in the shanks of the blades seated in the slots, and through aligned openings in the wedges. For adjusting the wedges, it has been customary to provide adjusting screws which are threaded into the cutter head, the screws having enlarged heads engaged in recesses in the bottoms of the wedges and, in order not to intersect the tension screws, these adjusting screws have been disposed in off-set relation to the tension screws, i.e. have been located at the sides rather than at the centers of the slots in the cutter head. The threaded bores in the cutter head for receiving the adjusting screws have therefore been located at the bottom corners of the blade-receiving slots. This weakens the cutter head, impairs the seating surfaces for the wedges and also, because of the asymmetrical arrangement, renders it virtually impossible to grind the bottom surfaces of the slots perfectly plane. The object of the present invention is to eliminate these difficulties by providing a symmetrical arrangement in which the adjusting screws are located centrally of the slots with their axes in intersecting relation to the axes of the tension screws.

A cutter according to the invention comprises a circular cutter head adapted to be secured to a rotary cutter spindle and having a plurality of slots about the circumference thereof for receiving the shanks of cutter blades, means for releasably securing said shanks in the slots, wedges in at least some of the slots for adjusting the blades radially, each such wedge being disposed between the related shank and a wedge-seating surface of the slot, each such wedge having a recess in the face thereof which contacts said seating surface, the cutter head having a screw-threaded bore for each such wedge, and an adjusting screw threaded into each such bore, the screw-threaded portion of each such bore opening through the wedge-seating surface, and a segment of the threaded portion of the screw projecting from said opening into the recess for abutment with opposed end walls thereof when the screw is turned to adjust the wedge.

With this arrangement a major part of the threaded portion of each adjusting screw is engaged with a complementarily screw-threaded bore in the cutter head, providing an adequate bearing for the relatively heavy loads which are sometimes applied to the screws while the wedges are being adjusted. At the same time the adjusting screws are short enough that they do not project into the spaces occupied by the tension screws lying in the same planes with them.

The preferred form of the invention is shown in the accompanying drawings, wherein:

Fig. 1 is a front elevation of the cutter mounted on a cutter spindle;

Fig. 2 is a section in the plane indicated by broken line 2—2 in Fig. 1; and,

Fig. 3 is an exploded view showing the parts concerned with the wedge adjustment.

The illustrated cutter comprises a circular cutter head 10 adapted to be secured by suitable means to the cutter spindle 11 of a bevel gear cutting machine. Preferably these securing means are of the general kind shown in co-pending application Serial No. 520,733 for "Rotary Cutter for Gears and the Like," filed on July 8, 1955, by F. E. McMullen. The head has a plurality of blade-receiving slots spaced about the circumference thereof. Every slot is the same and, as shown by the slots at the lower right of Fig. 1, each has parallel side walls 12 and a bottom wall 13 perpendicular to the side walls. The side walls are perpendicular to the plane of rotation of the cutter, while, as shown in Fig. 2, the bottom wall is inclined to this plane at a small angle. This angle corresponds to the relative angularity of the upper and lower surfaces, 14 and 15 respectively, of a wedge 16, one such wedge being seated on the bottom wall 13 of each slot.

Confined between the side walls 12, 12 of each slot is the generally orthogonal shank 17 of a cutter blade 18, and, disposed between the bottom surface 19 of the shank and upper surface 14 of the related wedge 16, is a parallel or shim 21. Such parallels are available in various thicknesses and by interchange enable the making of coarse adjustments of cutter radius, i.e. of the distance between the axis of rotation of the cutter and the cutting edges of the blades. The parallels may be omitted entirely in cases where no such coarse adjustments are contemplated. In such instances the blade shanks will seat directly on the wedges.

The blades are secured to the cutter head by headed screws 22 adapted to act in tension, the shanks of the screws extending through aligned openings 23 of the blades, parallels and wedges, and being screw threaded into threaded bores 24 in the cutter head. The screws 22 are disposed radially of the cutter and hence are perpendicular to the upper surfaces 14 of the wedges and to the upper surfaces of the blades which are abutted by the screw heads.

The wedge 16 for one blade, known as the "master" blade (shown at the extreme right of Fig. 1), is secured by a pin 25 against movement lengthwise of its slot in the cutter head. In the case of an alternate blade cutter, having alternating inside and outside cutting blades, there may be two such master blades, one inside and the other outside cutting. The wedges 16 for all of the remaining blades are adjustable, and for this purpose the bottom surfaces 15 of the wedges have recesses 26, Fig. 3, for receiving adjusting screws 27. Each adjusting screw is threaded into a screw-threaded bore 28 provided in the head at bottom of every slot except that for the master blade. As shown in Figs. 2 and 3, each bore 28 is central of and open into the related slot, so that a segment of each adjusting screw projects into the recess 26. As shown the bores 28 terminate short of the bores 24, which has the advantages that the adjusting screws 27 cannot be screwed against the holding screws 22 and so damage the threads of the latter, and, further, that the internal screw threads in bores 24 are uninterrupted. Opposed end faces 29 of the adjusting screw abut the adjacent walls of the recess so that upon first loosening the blade-holding tension screw 22 and then turning the adjusting screw by means of a screw driver or other suitable tool engaged in cross slot 31, the wedge may be moved out or in to adjust the radial position of the cutter blade 18 in the head 10. After such adjustment the screw 22 is retightened.

The cutter is trued in the usual manner, being mounted on a rotatable spindle and having its several blades adjusted until all of them correspond in radial position to the master blade or blades. Inasmuch as such adjustment must be very fine, the usual procedure is to only slightly loosen each screw 22 before adjusting the related wedge. This however means that there is high frictional resistance to movement of the wedges, leading to a proportionately high load on the threads of the adjusting screw 27 and bore 28. An important advantage of the present invention is that the part of the adjusting screw which is largest in diameter is the part that is threaded, and the major portion of this screw threaded part is in contact with the mating screw threads of bore 28, thus reducing as far as possible the load on the threads per unit of area. Furthermore the arrangement enables maximum linear adjustment of the wedges for a given depth of bore 28 and length of thread of the adjusting screw 27.

The positioning of the wedge adjusting screws and the bores 28 therefor in the centers of the blade-receiving slots not only increases the strength and rigidity of the cutter head 10 in comparison with prior cutter heads having the adjusting screw in the corners of the slots, but it also results in the bottom walls 13 having symmetrical areas on both sides of the bores 28. This greatly facilitates grinding the walls 13 perfectly plane and thereby further contributes to the accuracy of the cutter.

Having now described the preferred form of the improved cutter, what I claim as my invention is:

1. A face mill cutter for spiral bevel gears and the like, comprising a circular cutter head adapted to be secured to a rotary cutter spindle in coaxial relationship therewith, said head having a plurality of circumferentially spaced blade-receiving slots in the periphery thereof, each slot having two parallel side walls perpendicular to the plane of rotation of the cutter and a bottom wall perpendicular to the side walls and inclined to said plane of rotation, a plurality of blades having the shanks thereof seated in said slots and confined between said side walls, adjusting wedges in said slots between the bottom walls of the slots and the shanks of the blades, the upper surfaces of said wedges being perpendicular to said plane of rotation, tension screws threaded into the head for securing the blades in their respective slots, each tension screw extending through aligned openings in the wedge and the shank of the related blade, each such screw being perpendicular to the upper surface of the related wedge and radial of the cutter head, at least some of the wedges having recesses in the bottom surfaces thereof for receiving adjusting screws, and an adjusting screw for each such wedge, each adjusting screw being screw-threaded into the head and the screw-threaded portion thereof projecting into the recess of the wedge, the axis of each adjusting screw lying in the plane common to the axis of rotation of the cutter head and the axis of the related tension screw, said plane being parallel to and equally spaced from the side walls of the related slot, and each adjusting screw having opposed end faces for abutment with end surfaces of the recess in the related wedge.

2. A cutter according to claim 1 in which the cutter head has screw-threaded bores for said tension screws and other screw-threaded bores for said adjusting screws, said bores for the adjusting screws opening through the bottom walls of the related slots at the front face of the cutter head but terminating short of said screw-threaded bores for the tension screws.

3. A face mill cutter for spiral bevel gears and the like, comprising a circular cutter head adapted to be secured to a rotary cutter spindle and having a plurality of slots about the circumference thereof for receiving the shanks of cutter blades, means for releasably securing said shanks in the slots, wedges in at least some of the slots for adjusting the blades radially, each such wedge being disposed between the related shank and a wedge-seating surface of the slot, each such wedge having a recess in the face thereof which contacts said seating surface, the cutter head having a screw-threaded bore for each such wedge, and an adjusting screw threaded into each such bore, the screw-threaded portion of each such bore opening through the wedge-seating surface, and a segment of the threaded portion of the screw projecting from said opening into the recess for abutment with opposed end walls thereof when the screw is turned to adjust the wedge.

4. A cutter according to claim 3 in which the means for securing said shanks comprises a holding screw for each blade extending through aligned openings in the blade shank and the wedge and screw-threaded into the cutter head for drawing the blade toward said seating surface, the axis of the holding screw lying in the same plane as the axis of the adjusting screw and the axis of rotation of the cutter, and each of said slots having opposed side walls for confining the blade shank, said side walls being parallel to and equidistant from said plane, and said seating surface constituting the bottom wall of the slot and being perpendicular to said side walls.

References Cited in the file of this patent

UNITED STATES PATENTS

| | | |
|---|---|---|
| 2,125,943 | McMullen | Aug. 9, 1938 |
| 2,524,301 | Bauer | Oct. 3, 1950 |